United States Patent [19]
Carlberg

[11] Patent Number: 5,358,007
[45] Date of Patent: Oct. 25, 1994

[54] DOWNSPOUT WITH SWIVEL AND FLOW DIVERTER

[76] Inventor: Stanley B. Carlberg, 676 Ashland Ave. W., St. Paul, Minn. 55102

[21] Appl. No.: 152,989

[22] Filed: Nov. 15, 1993

[51] Int. Cl.$^5$ .............................................. F16L 27/00
[52] U.S. Cl. ................................. 137/615; 137/561 A; 52/16; 138/37; 239/522
[58] Field of Search .................. 137/615, 873, 561 A, 137/802; 138/40, 39, 42, 43, 37; 52/16; 239/498, 505, 522, 587.5, 587.6

[56] References Cited

U.S. PATENT DOCUMENTS

| | | |
|---|---|---|
| 2,210,248 | 8/1940 | Lighthill ............................ 52/16 X |
| 2,334,779 | 11/1943 | Luff . |
| 2,567,004 | 9/1951 | Benck . |
| 2,800,925 | 12/1954 | Tollefsen . |
| 2,898,939 | 8/1959 | Fox . |
| 2,975,805 | 3/1961 | Horn . |
| 3,048,983 | 8/1962 | Crummel . |
| 3,060,952 | 11/1962 | Bystrom . |
| 3,316,928 | 5/1967 | Weakley . |
| 3,375,851 | 4/1968 | Fitz Henry et al. . |
| 3,429,125 | 2/1969 | Shotton . |
| 3,636,830 | 1/1972 | Watts . |
| 4,135,540 | 1/1979 | Felsen ............................ 137/615 X |
| 4,270,572 | 6/1981 | Jarzynka ............................ 137/615 |
| 4,345,853 | 8/1982 | Fisher ................................ 52/16 X |
| 4,693,633 | 9/1987 | Giordano ........................... 52/16 X |
| 5,014,745 | 5/1991 | Watt .................................. 137/615 |

Primary Examiner—Martin P. Schwadron
Assistant Examiner—Kevin L. Lee

[57] ABSTRACT

An adjustable telescoping downspout which can be laterally or vertically adjusted to a preferred position, extended longitudinally or retracted upwardly to an inoperative position. The two-piece trough is attachable to the downspout in a turret-like arrangement and requires no tools or hardware. The trough further includes a flow diverter at the distal end thereof for diverging and deflecting the water flow in a fan-shape to reduce the likelihood of soil erosion. The flow diverter can either be integrally formed with the trough, or provided as a separate member which can be selectively attached to the distal end of a trough. The diverter member includes a plurality of diamond-shaped protrusions for directing water flow over the side edges of the diverter member and which has a tongue-shape.

19 Claims, 2 Drawing Sheets

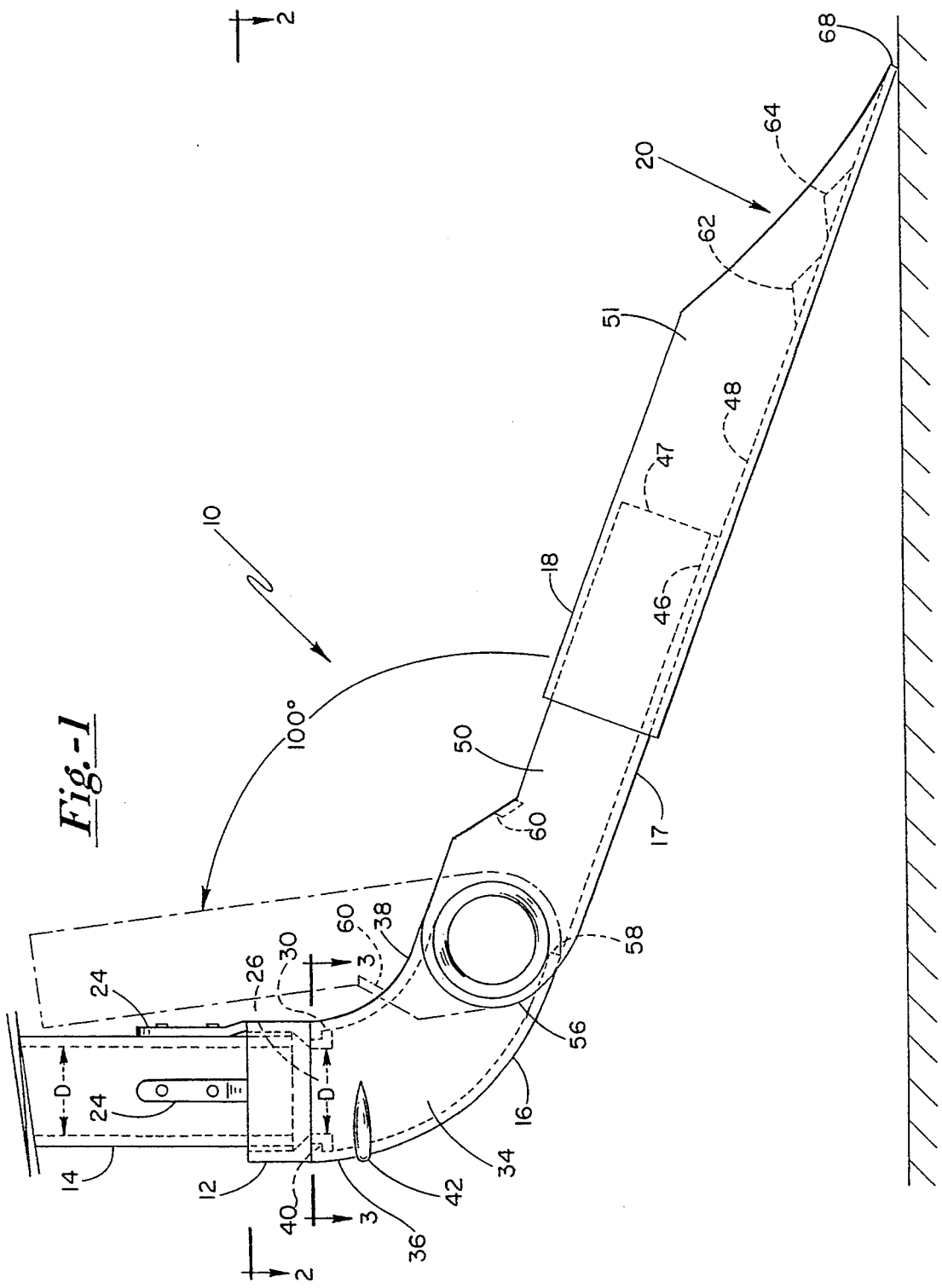

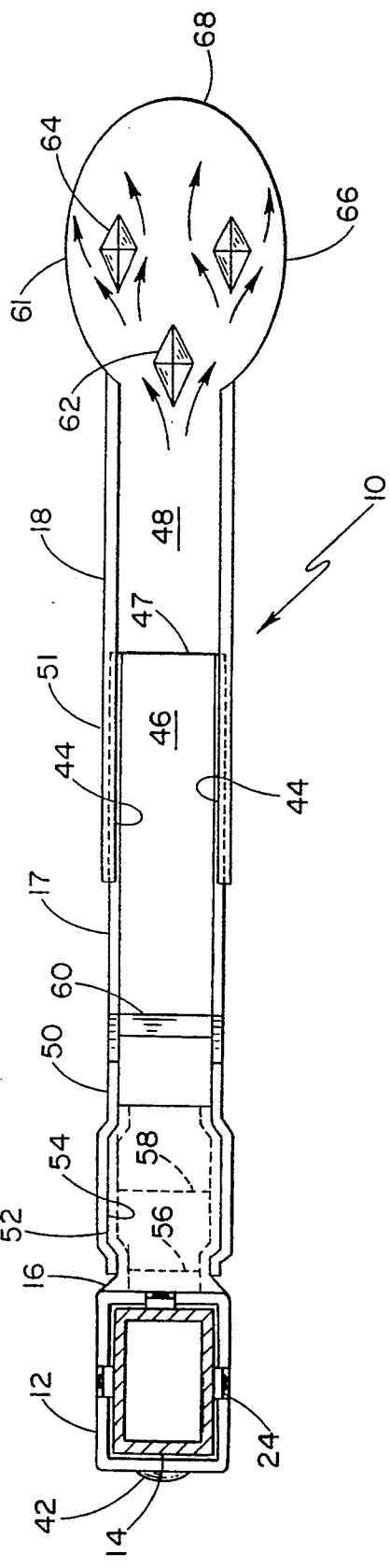
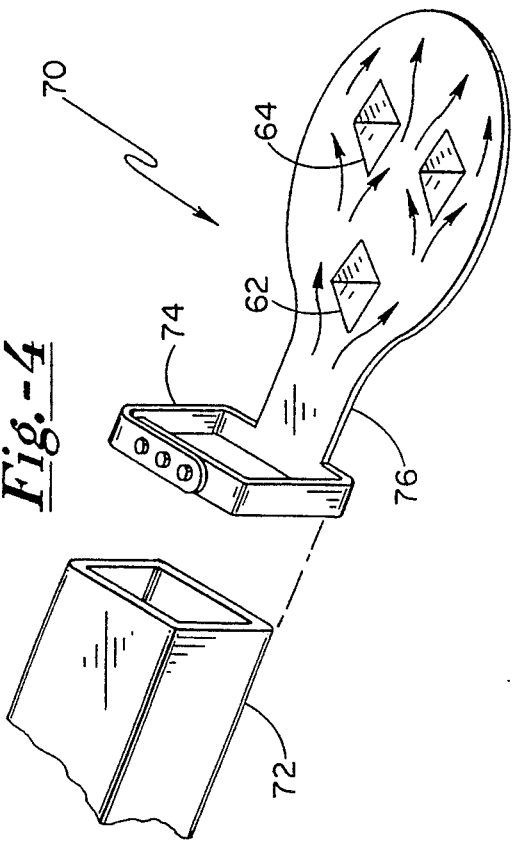
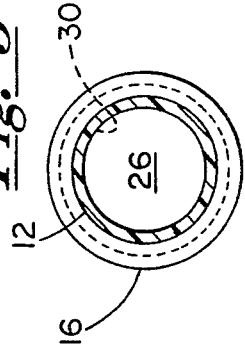

DOWNSPOUT WITH SWIVEL AND FLOW DIVERTER

FIELD OF THE INVENTION

The present invention is generally related to downspouts for use in connection with buildings, and more particularly to an adjustable downspout which is easy to use and less susceptible to damage.

BACKGROUND OF THE INVENTION

Conventional downspouts which are commonly used for structures including houses, condominiums and buildings, are utilized to redirect water away from the structure's foundation to avoid eventual damage thereto, soil erosion, and to minimize damage to landscaping. Downspouts typically route large volumes of water from the structure's roof at a high flow rate during both an average rain fall, and especially during a torrential rain. Thus, downspout troughs are typically implemented at the bottom of a downspout to help reduce the flow rate before dispensing to minimize damage to landscaping. However, these drain troughs are typically fixedly placed in front of the downspout and are not adjustably and removably adapted to the downspout.

The lower portions of the downspouts and the troughs are known to be susceptible to damage, from the homeowner, children, and especially by commercial lawn care services which are always in a hurry and do not always take great care to avoid damage to the downspouts. Some services just simply kick the troughs of the downspout aside and out of the way, and replace them after mowing the area. Others will slam the lawn mower against the trough while mowing the adjacent portion of grass. When the downspouts or troughs are repeatedly subjected to this treatment, both the aesthetic appearance of the downspout is degraded, as is the functional ability of the downspout to be reconnected to the downspout.

Moreover, downspouts are typically subjected to repeated abuse by children running around the buildings when playing tag, hide-and-seek, and the like. Most houses have more than one downspout, and repeatedly replacing damaged downspout troughs is expensive, time consuming, and frustrating. Accordingly, a downspout dispensing end or trough which can be disposed in a selectable position, as well as a non-use position to minimize damage thereto, is desired. Further, a downspout which reduces the flow rate to reduce the likelihood of damage to adjacent landscaping is desired, and which is adaptable to commercially available downspouts having a variety of sizes.

U.S. Pat. No. 4,135,540 to Felsen teaches a manual or automatic drainage device for downspouts. This device implements a retractable trough which can be held vertically against the downspout when not in use. However, this device cannot be rotated in the lateral direction, but rather, includes a rear surface which abuts and is securable to the structure wall. Further, this device requires mounting hardware including a bolt, washers and nuts disposed therethrough to pivotably attach the trough to the downspout. Thus, complete removal of the trough from the downspout would require time, tools, and considerable patience when the hardware becomes rusted or damaged due to the elements of nature.

Likewise, U.S. Pat. No. 2,975,805 to Horn teaches a downspout extension which can be retracted upwardly, but which also requires hardware and tools for installation and removal thereof. U.S. Pat. No. 3,060,952 to Bystrom; 2,567,004 to Benck; 5,014,745 to Watt; 3,375,851 to Henry; and U.S. Pat. No. 4,270,572 to Jarzynku similarly teach retractable downspout troughs which all require hardware for the installation thereof, and which cannot be pivoted in the lateral direction.

U.S. Pat. No. 3,316,928 to Weekley teaches an extension attachment for guttering downspouts. This patent also teaches an extension of a trough which is retractable, and the direction of which can be altered by turning a swivel connection. However, the swivel connection comprises of a sleeve which frictionally engages the elbow such that it can support the weight of the trough, especially when water is impinging upon the trough input end at a large flow rate. Thus, due to this friction, the trough cannot be easily rotated in the lateral direction, but rather, needs to be adjusted by removing the sleeve, rotating the trough in the lateral direction, and then reinserting the sleeve into the larger sleeve formed by the downspout.

U.S. Pat. No. 2,334,779 to Luff teaches a splash block including a plurality of ribs which stiffen the conduit for rigidity, and provide diverging channels to help spread out the stream of water as it approaches the outlet. However, a majority of the water is still dispensed over the end of the trough in a concentrated area and is not deflected over the side edges, and thus can damage or erode landscaping and grass adjacent to the distal end. Further, this device is adapted to be fixedly installed into the earth, and thus needs to be removed from the earth before any adjustment can be performed.

U.S. Pat. No. 2,800,925 to Tollefsen et al. teaches a downspout flow diverter which is secured to the elbow of a downspout which includes a curved spiral portion which deflects water laterally at right angles to the original passage. During a heavy rainfall, all of the water will be dispensed over the distal end of the element.

U.S. Pat. No. 3,429,125 to Shotton teaches an irrigation pipe with erosion preventing outlets. This device implements a sleeve comprised of a fine mesh for diffusing water therethrough to prevent erosion. The distal end or lip portions of the screens are stitched closed, wholly or partially, to impede the flow of water and slow down the velocity thereof. Thus, while the mesh may help diffuse the water, in application this mesh would restrict the flow of water from a downspout if adapted thereto which could cause standing water in the downspout. This standing water would have great weight and may cause the downspout to detach from the structure wall.

U.S. Pat. No. 3,636,830 teaches a drain trough having convolutions with openings disposed therebetween, wherein the convolutions interrupt water flow so that some water is forced to flow downward through the openings to start a soaking action into the ground. However, a majority of the water flow will be dispensed over the distal end which could cause erosion to the soil adjacent thereto.

U.S. Pat. No. 4,345,853 and 4,693,633 both teach run-off troughs which direct water to the distal end thereof and which can cause soil erosion proximate the distal end.

OBJECTS

It is accordingly a principle object of the present invention to provide a downspout trough which is easily adjustable in two directions such that it can be disposed in a selected position when used, and selectively retracted when not is use to prevent damage thereto.

A further object of the present invention is to provide a downspout trough which can be extended in length.

It is a further object of the present invention to provide a downspout trough having a unique distal end to dispense and divert water thus minimizing soil erosion proximate the distal end.

Still yet a further object of the present invention is to provide a downspout trough which can be quickly adapted to and removed from a downspout without using hardware, tools, or requiring a significant amount of time for installation.

Still yet a further object of the present invention is to provide a unique downspout which is easy to use, adaptable to downspouts of a variety of sizes, easy to manufacture, has an aesthetically present appearance, and which can withstand the elements of mother nature.

SUMMARY OF THE INVENTION

The foregoing objects and advantages of the present invention are achieved by providing a telescoping downspout trough apparatus which can be easily and selectively pivoted in both the lateral and vertical direction, and extended in the longitudinal direction. The downspout trough apparatus resembles a turret, wherein a yoke-shaped portion of the trough is adapted about the elbow such that it can be easily and selectively adapted thereto without hardware. The distal end of the two-piece trough has uniquely designed protrusions such that water is dispersed and deflected in a large fan-shape.

Specifically, the invention comprises an adjustable trough adaptable to a downspout lower end and includes an elbow member having a fluid passageway extending between an inlet and an outlet thereof. The elbow member has a first securing surface disposed proximate the outlet wherein the inlet is adapted to couple to the downspout lower end. An elongated telescoping two-piece drain trough extends between a receiving end and a dispensing end. The receiving end has a second securing surface which conforms to the contour of the first securing surface of the elbow. The drain trough can be selectively and securingly attached thereto and defines a pivot point. The drain trough can be selectively pivoted upwardly about the pivot point when attached to the elbow. The length of the trough can be adjusted by telescoping the distal member about and along the proximal member.

In the preferred embodiment, the elbow further comprises a coupling member at the elbow inlet. The coupling member has a lower end which is pivotally attached to the elbow inlet, and has an upper end which is adapted to securingly couple to the downspout lower end. Preferably, the coupling member comprises a tubular member having a flanged lower end which is pivotally attached to the elbow inlet to facilitate easy rotation of the trough in the lateral direction. The flanged lower end of the coupling member helps support the weight of the elbow and trough, especially when large quantities of water are being communicated therethrough, yet which allows free rotation thereof with a minimal force. Thus, during a mowing operation, one can simply urge or nudge the trough with one's foot in the lateral direction to expose the grass for mowing.

In the preferred embodiment, the first securing surface of the elbow comprises a pair of protrusions extending outwardly at opposing sides of the elbow. The second securing surface of the drain trough comprises a pair of recesses which conform to the protrusions of the elbow. The elbow first securing surface including the pair of protrusions forms a yoke, which yoke pivotably receives the second securing surface of the drain trough.

The diverter portion of the drain trough can either be integrally formed with the trough, or selectively attached thereto. The diverter member or portion when used as a separate attachment can be selectively coupled to the drain trough dispensing end. The diverter member has a pair of side edges and a distal end, and further has means for diverting a fluid over both sides and over the end of the diverter in a fan-shape. Preferably, the means for diverting the fluid comprises at least one protrusion defined in the central portion thereof and which extends upwardly. Preferably, a plurality of protrusions are defined in a substantially triangular pattern to fan the water flow over both side edges and the distal end of the diverter member. In a preferred embodiment, the protrusions each have a generally diamond shape.

BRIEF DESCRIPTION OF THE DRAWINGS

FIG. 1 is a side elevational view of the adjustable drain trough including a coupling member and elbow, and a telescoping drain trough which can be easily adjusted in the lateral direction, pivoted upwardly in a retracted position, and selectively extended in length;

FIG. 2 is a top view 2—2 shown in FIG. 1 illustrating the yoke-shaped attachment between the elbow lower end and the drain, trough to facilitate a turret feature, wherein the telescoping trough can be extended in length, and further which illustrates the diamond shaped protrusions at the distal end of the trough for diverting and deflecting water flow in a fan-shape over both the side edges and the distal end;

FIG. 3 is a sectional view 3—3 shown in FIG. 1 illustrating the flanged portion of the coupling member rotatably disposed in the elbow member for facilitating rotation of the trough in the lateral direction; and FIG. 4 is a perspective view of a diverter member which can be selectively attached to the distal end of a variety of drain troughs and includes an adjustable strap.

DESCRIPTION OF THE PREFERRED EMBODIMENT

Referring now to FIG. 1, a downspout attachment assembly according to the preferred embodiment is generally shown at 10. Assembly 10 includes four pieces, namely, a tubular coupling member or ring 12 which receives and is fixedly secured to the lower end of a downspout 14, an elbow member 16 rotatably coupled to the coupling member 12 and having a passageway extending therein, and a two-piece drain trough comprised of distal member 17 and proximal member 18. Proximal member 17 is pivotably attached to the distal end of elbow 16. Elbow 16 has a yoke-shape distal end for rotatably and securingly receiving the proximal end of member 17. The distal end of distal trough member 18 includes a flow diverting and deflecting portion generally shown at 20 which causes water impinged thereon to be dispensed in a fan-shape pattern therefrom.

Coupling ring 12 is preferably formed of polypropylene plastic and includes a plurality of integrally formed attachment straps 24. Straps 24 have openings defined at predetermined intervals therein such that fasteners, such as sheet metal screws, can be disposed therethrough and into downspout 14 to facilitate attachment of coupling member 12 thereto. Coupling member 12 has an opening or passageway defined therethrough which tapers to a narrower portion at a lower end thereof. This passageway, generally labeled at 26, is adapted to receive downspout 14 like a sleeve and which can have a variety of diameters. The diameter of downspout 14 will determine at just what location the lower end of downspout 14 will engage the inner walls of coupling member 12. The upper end of passageway 26 has a generally rectangular or square cross section (see FIG. 2) which transforms to a cylindrical opening at a lower end thereof (see FIG. 3). This feature is provided due to the nature that most commercially available downspouts 14 have a rectangular cross section. However, this design facilitates attachment to a downspout having a circular profile as well. Alternatively, the passageway upper end can have a circular cross as well if desired.

The lower end of coupling 12 is further characterized as having a flange portion 30 defined at a lower end thereof defined by a tab extending outwardly therearound and away from passageway 26. This flange portion 30 is selectively rotatably disposed within a passageway 34 of elbow 16 at an inlet end 36 thereof. Elbow 16 also has an outlet end 38 such that fluid can be communicated from downspout 14 to distal end 38. Inlet end 36 has a flanged upper end forming a circular shoulder extending inwardly at 40 wherein flange 30 engages shoulder 40 thereunder such that elbow 16 can be pivotably rotated about flange 30 of coupling member 12. The mating surfaces of weight supporting flange 30 and shoulder 40 are sufficient to support the weight of elbow 16 and the two-piece trough, such as when large quantities of water are being dispensed therethrough wherein the water impinges upon the inner surface of elbow 16 causing a downward force thereon. It is specifically noted that the diameter of passageway 26 defined proximate flange 30, and labeled at "D", is identical to the diameter of downspout 14, also identified as dimension "D". Thus, the flow rate of water dispensed therethrough will not be restricted.

Elbow 16 is also preferably comprised of polypropylene, and thus, very little friction is generated by the engaging surfaces of weight supporting flange 30 and shoulder 40 when rotated. Thus, when trough proximal member 17 is pivotably attached to elbow 16, one can simply nudge the trough in a lateral direction, such as using one's foot, causing lateral rotation thereof about coupling member 12. Elbow 16 also includes an arcuate shaped rib or protrusion 42 which extends laterally around a peripheral surface at an upper end thereof. Protrusion 42 provides a bearing surface which may engage the wall of the structure the assembly is attached thereto such that only this protrusion will wear if, for instance, it is caused to rub against a brick foundation. The remaining portions of coupling member 12, and elbow 16 will remain free from scratches and will maintain an aesthetically pleasant appearance.

Trough members 17 and 18 are each elongated and have a generally U-shape defining a channel along the length thereof. Distal trough member 18 has a longitudinally extending lip 44 along the top edge on each side, which lip 44 overlaps the respective top edge of proximal trough member 17. Distal trough member 18 slidably constrains proximal trough member 17 therewithin to facilitate a telescoping adjusting feature. Each trough member 17 and 18 is sufficiently flexible such that if a child inadvertently steps on the trough, the two pieces will separate without damage to the members. Proximal trough member 17 has a trough bottom surface 46 and a distal end 47. Distal trough member 18 has a bottom surface 48 extending to a proximal end of trough member 18. The proximal trough member 17 tapers to a point positioned underneath the distal end of elbow 16, as shown. Thus, the distal end of elbow 16 overlaps the proximal end of trough 17 as shown such that water will be sealingly communicated thereover and onto the bottom surface 46. This arrangement further facilitates a non-interference arrangement such that trough 17 can be pivoted and retracted upwardly approximately 100 degrees, as shown, to a stored position. Similarly, the distal end 47 of trough member 17 overlaps the proximal end and bottom 48 of distal trough member 18.

Referring now to FIG. 2, trough members 17 and 18 each have a pair of side walls 50 and 51, respectively, sidewalls 50 extend to a proximal end 56 and form a yoke-shape securing feature about the conforming distal end of elbow 16. Specifically, the proximal end of side walls 50 bow outwardly and have a tapered circular recess 52 on an inside surface thereof. Also shown in FIG. 2 is the distal end of elbow 16 bowing outwardly, wherein each of the two sides of elbow 16 have a circular tapered protrusion 54 which conforms to the shape of the respective recess 52 of the yoke-shaped proximal end of trough member 17. This yoke-shape arrangement with conforming recesses and protrusions allows trough member 17 to be pivoted about the distal end of elbows 16 in the upward direction in a turret-like arrangement. Trough members 17 and 18 are is also preferably comprised of polypropylene, and thus, very little friction is generated between the mating surfaces of elbow 16 and trough member 17, or between adjacent surfaces of trough members 17 and 18.

As shown, the tapered proximal end of bottom surface 46, shown at 56, extends laterally between the ends of side members 50 at a location between the conforming surfaces and downspout 14. The terminating distal end of elbow 16 is generally shown at 58 and which extends laterally between the mid-section of the mating surfaces. The opening formed at the lower distal end of elbow 16 is generally rectangular such that edge 58 is in flush contact upon the flat bottom surface 46 when trough member 17 is in the lower position, as shown in FIG. 1.

Trough member 17 is further characterized as having a brace 60 extending between side walls 50 and above bottom surface 46. Brace 60 provides structural rigidity of the trough 18 when the proximal end forming the yoke is rotatably and securingly adapted about mating surfaces 54 of elbow 16. Since trough member 17 is formed of polypropylene plastic, the proximal end of each side member 50 can be bent slightly outward using one's hand to attach or remove the conforming recess 52 about the conforming protrusion 54 without damaging the trough or degrading the functionality of the yoke-shaped proximal ends. Brace 60 is defined distal of the bow-shaped proximal ends of member 17 so as not to restrict upward rotation of trough member 17, as shown in FIG. 1. When fully retracted, as shown in FIG. 1, brace 60 will be urged against the upper surface of elbow 16, wherein side members 50 will be disposed about the upper portion of downspout 14 in a wrap-around manner.

Still referring to FIG. 2, it can be seen at the distal end of trough member 18 a tongue-shaped flow diverter and deflecting portion generally identified at 61 having a width significantly greater than the width of trough member 18. Formed in the mid-section of bottom surface 48 at diverter portion 61 is a plurality of upwardly extending diamond-shaped protrusions arranged in a generally triangular pattern. Thus, water dispensed along the channel of trough member 18 will first impinge upon the forward diamond-shaped protrusion 62 divides the flow into two portions. These two portions of flow will each impinge upon a respective rearward diamond 64 which will similarly divert the flow into two portions. Thus, the water flowing through the channel of trough member 18 will be repeatedly divided by the diamond-shaped protrusions. The upwardly extending protrusions are defined in a mid-section of bottom surface 48 forming diverter portion 61 such that the water flow is ultimately divided into a large fan-shape pattern as indicated by the arrows. The tongue-shaped distal end of trough member 18 is defined by a pair of arcuately-shaped side edges 66 and a distal edge 68. The plurality of protrusions 62 and 64 cause water impinged thereon to flow over both the side edges 66 and the distal edge 68 such that soil erosion about the tongue-shaped distal end is reduced. Preferably, each protrusion has a height of two inches, however, limitation to this height is not to be inferred.

While a plurality of diamond shaped protrusions arranged in a generally triangular arrangement is the preferred embodiment, it is to be recognized that a plurality of protrusions having different dimensions and arranged in other configurations would be suitable as well for diverting and deflecting water flow both laterally and forwardly in a fan-shape pattern to cause divergence of the flow.

Referring now to FIG. 4, an alternative embodiment of the present invention is shown wherein a tongue-shaped flow diverter member is shown as a separate member at 70. Member 70 can be selectively attached to the distal end of a conventional downspout, indicated at 72. Diverter member 70 has substantially identical features as the tongue-shaped distal end 61 of trough 18, shown in FIG. 2, with the additional feature of an adjustable attachment strap 74 which can be selectively and securingly wrapped about the distal end of downspout 72. Strap 74 preferably comprises a pair of straps integrally formed with and extending laterally from the proximal end of member 70. The end of one strap has a plurality of openings at predetermined uniformly spaced intervals, and the end of the other strap has a plurality of uniformly spaced protrusions which are securingly insertable through the conforming openings of the other strap to secure one strap to the other. This arrangement is similar to the attachment straps of typical baseball hats. Thus, a tight friction fit can be established between straps 74 and a downspout 72 having a variety of dimensions and shapes.

Also shown in FIG. 4 is the relative dimensions of diamond-shaped protrusions 62 and 64, wherein each preferably has a height dimension of approximately two inches, however, limitation to this dimension is not to be inferred. Also shown is the front or leading protrusion 62 being disposed closely proximate to a distal end 76 of member 70 such that water dispensed from downspout 72 will immediately impinge thereon and be separated and deflected into two laminar flows. Again, as mentioned earlier with reference to FIG. 2, limitation to the shapes, location, and number of protrusions which cause the water to be diverged and deflected in a fan-like shape is not to be inferred. Likewise, limitation to the particular attachment feature of strap 74 is not to be inferred for other attachment features, such as clamps or elastic bands, could be implemented as well to facilitate attachment of member 70 to standard downspouts 72.

Diverter member 70 is preferably comprised of polypropylene material and can be easily manufactured. Further, all members including coupling member 12, elbow 16, trough 18 and diverter member 70 can be comprised of any desired color using polypropylene material.

One principle feature of the present invention is that trough member 17 can be easily adapted to elbow 16 without using any tools. The length of the trough can be selected using the telescoping feature of trough members 17 and 18. Further, since the apparatus is comprised of polypropylene material and the trough is comprised of two separable pieces, it is resilient to the elements of nature and is not easily damaged by careless lawn takers or children. By implementing coupling member 12, the invention is adaptable to a variety of commercially available downspouts, whether of a circular or rectangular cross section. However, limitation to an apparatus implementing coupling member 12 is not to be inferred since elbow 16 can be secured to downspout 14, such as by including integrally defined straps similarly shown at 24, or using other well known fastening devices such as sheet metal screws disposed therethrough to provide a downspout trough which can only be adjusted in the vertical direction. Thus, the various features of the present invention can be used either in combination or standing alone. Further, the diverter member can be provided as a separate member 70 and adapted to a variety of commercially available downspouts 72, or defined integral to a trough 18 as shown in FIG. 2.

The friction generated between conforming surfaces 52 and 54, between adjacent trough members 17 and 18 as well as between flange 30 and shoulder 40, is minimal such that pivoting of the respective members requires little effort. Further, trough member 17 can be quickly and easily attached to or removed from elbow 16 by flexing the yoke-shaped proximal end forming surfaces 52 about conforming surface 54. Similarly, coupling member 12 can be easily adapted to downspout 14 using the straps and fasteners as discussed. Coupling member 12 is selectively detached from or attached to elbow 16 by squeezing the outer surface thereof proximate shoulder 40 which helps facilitate flange 30 to be removed therefrom. If desired, a longitudinal slit can be defined in the wall through flange 30 to better facilitate squeezing. Finally, the flow of water from downspout 14 is not restricted through member 12 and elbow 16 due to the large and uniform passageways which are maintained therethrough.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. An adjustable attachment adaptable to a downspout lower end, comprising:
   (a) an elbow conduit member having a fluid passageway extending between an inlet and an outlet, said elbow conduit member having a first securing surface comprising at least one raised portion extending outwardly and disposed proximate said outlet, and wherein said inlet is adapted to couple to said downspout lower end; and
   (b) an elongated drain trough extending between a receiving end and a dispensing end, said receiving end having a second securing surface comprising at least one recessed portion conforming to a contour of said raised portion at said first securing surface and selectably attachable thereto and defining a pivot point, wherein said drain trough can be selectively pivoted upwardly about said pivot point while attached to said elbow.

2. The attachment as specified in claim 1 wherein said elbow conduit member further comprises a coupling member having a lower end rotatably attached to said elbow inlet, said coupling member having an upper end opposite said lower end which is adapted to couple to said downspout lower end.

3. The attachment as specified in claim 2 wherein said coupling member comprises a tubular member having a flanged lower end rotatably attached to said elbow inlet.

4. The attachment as specified in claim 1 wherein said drain trough second securing surface is defined by a yoke, said yoke pivotally receiving the first securing surface of said elbow conduit member.

5. The attachment as specified in claim 4 wherein said first securing surface of said elbow conduit member comprises a pair of protrusions extending outwardly on generally opposing sides of the elbow, and said second securing surface of said drain trough comprises a pair of recesses conforming to the respective protrusions.

6. The attachment as specified in claim 1 further comprising a diverter member coupled to said drain trough dispensing end and having a pair of side edges and a distal end, said diverter member having means for diverting a fluid comprising at least one upwardly extending protrusion defined in a central portion thereof for diverting a fluid over both of the side edges and of the diverter distal end.

7. The attachment as specified in claim 6 wherein said diverter means comprises at least three protrusions arranged in a substantially triangular pattern with one disposed close to said trough dispensing end.

8. The attachment as specified in claim 1 wherein said drain trough comprises of two telescoping members to facilitate longitudinal adjustment thereof.

9. A diverter adapted to be secured to a dispensing end of a drain trough, comprising:
   (a) a member having a generally flat top surface, a proximal end, a pair of side edges and a distal end extending therebetween, said member further comprising diversion means for diverting and spreading a fluid flow traversing said top surface from said proximal end laterally over and about both said member side edges and over said member distal end in a fan-shape pattern.

10. The diverter as specified in claim 9 wherein said diversion means comprises at least one upwardly extending protrusion defined in a central location of said top surface.

11. The diverter as specified in claim 10 wherein said diversion means comprises a plurality of protrusions.

12. The diverter as specified in claim 11 wherein said diversion means comprises at least three protrusions arranged in a substantially triangular pattern with one disposed proximate said member proximal end.

13. The diverter as specified in claim 10 wherein said protrusion has a generally diamond-shape.

14. The diverter as specified in claim 9 further comprising means for selectively securing said diverter to said drain trough dispensing end.

15. An adjustable attachment adaptable to a downspout lower end, comprising:
   (a) an elbow conduit member having a fluid passageway extending between an inlet and an outlet, said elbow conduit member having a first securing surface disposed proximate said outlet, said elbow conduit member further comprising a coupling member having a lower end rotatably attached to said elbow inlet, and having means for securing said coupling member lower end to said elbow conduit member inlet, said coupling member having an upper end opposite said lower end which is adapted to couple to said downspout lower end; and
   (b) an elongated drain trough extending between a receiving end and a dispensing end, said receiving end having a second securing surface selectably attachable to said first securing surface and defining a pivot point, wherein said drain trough can be selectively pivoted upwardly about said pivot point while attached to said elbow.

16. The attachment as specified in claim 15 wherein said coupling member comprises a tubular member, and wherein said securing member comprises a flanged lower end rotatably attached to said elbow inlet.

17. The attachment as specified in claim 15 wherein said trough second securing surface conforms to a contour of said elbow member first securing surface.

18. An adjustable attachment adaptable to a downspout lower end, comprising:
   (a) an elbow conduit member having a fluid passageway extending between an inlet and an outlet, said elbow conduit member having a first securing surface disposed proximate said outlet, and wherein said inlet is adapted to couple to said downspout lower end; and
   (b) an elongated drain trough extending between a receiving end and a dispensing end, said receiving end having a second securing surface selectably attachable to said first securing surface and defining a pivot point, wherein said drain trough can be selectively pivoted upwardly about said pivot point while attached to said elbow, said dispensing end having a pair of side edges, a distal edge, and diverting means comprising at least one upwardly extending protrusion defined in a central portion thereof for diverting and spreading a fluid laterally over both of said side edges and said distal edge in a fan-like manner.

19. The attachment as specified in claim 18 wherein said diverter means comprises at least three protrusions arranged in a substantially triangular pattern for sequentially spreading fluid flowing therepast.

* * * * *